United States Patent [19]
Okami et al.

[11] Patent Number: 5,104,919
[45] Date of Patent: Apr. 14, 1992

[54] CURABLE SILICONE COMPOSITION

[75] Inventors: Takehide Okami; Masanobu Miyakoshi; Hajime Kiriki, all of Annaka, Japan

[73] Assignee: Shin-Etsu Chemical Co., Ltd., Tokyo, Japan

[21] Appl. No.: 493,734

[22] Filed: Mar. 15, 1990

[30] Foreign Application Priority Data

Mar. 16, 1989 [JP] Japan .................................. 1-64130

[51] Int. Cl.$^5$ ................................ C08K 5/48
[52] U.S. Cl. .................................. 524/94; 524/100; 524/104; 524/105; 524/106; 524/588; 524/430; 524/431; 524/432; 524/447; 524/451; 524/783; 524/862; 524/785; 524/786; 524/780; 524/189; 524/791; 524/443; 524/448; 528/15; 525/478
[58] Field of Search ............... 528/15; 525/478; 524/588, 431, 430, 432, 443, 448, 447, 451, 862, 783, 785, 786, 780, 787, 791, 94, 100, 104, 105, 106

[56] References Cited

U.S. PATENT DOCUMENTS

| | | | |
|---|---|---|---|
| 3,923,705 | 12/1975 | Smith | 528/15 |
| 4,743,670 | 5/1988 | Yoshida et al. | 528/31 |
| 4,868,251 | 11/1989 | Reich et al. | 525/479 |

FOREIGN PATENT DOCUMENTS

| | | |
|---|---|---|
| 0153700 | 9/1985 | European Pat. Off. |
| 0154411 | 9/1985 | European Pat. Off. |

OTHER PUBLICATIONS

Patent Abstracts of Japan, vol. 10, No. 235 (C-366) [2291], Aug. 14, 1986; JP-A-61 069 865 (Toray Silicon) Oct. 4, 1986.

WPIL, File Supplier, Nr. 89-176253, Derwent Publications Ltd., London, GB.

*Primary Examiner*—Melvyn I. Marquis
*Attorney, Agent, or Firm*—Oblon, Spivak, McClelland, Maier & Neustadt

[57] ABSTRACT

A curable silicon composition comprising:
(A) an organopolysiloxane containing at least two silicon-bonded unsaturated aliphatic hydrocarbon groups and having a viscosity of from 100 to 200,000 cSt at 25° C.,
(B) a vinyl group-containing organocyclopolysiloxane having the general formula (I):

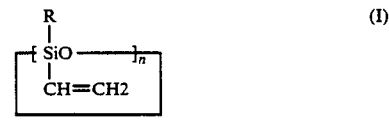

wherein R represents a hydrocarbon group having from 1 to 6 carbon atoms excluding unsaturated aliphatic hydrocarbon groups, and n represents an integer of from 3 to 8,
(C) an organohydrogenpolysiloxane containing at least two silicon-bonded hydrogen atoms in the molecule,
(D) a platinum family metal catalyst, and
(E) a triazole compound.

This curable silicone composition has good curing properties and can produce cured products having a markedly small permanent compression set.

9 Claims, No Drawings

CURABLE SILICONE COMPOSITION

BACKGROUND OF THE INVENTION

1. Field of the Invention

The present invention relates to a curable silicone composition, and in particular to a curable silicone composition capable of producing a cured product having a small permanent compression set.

2. Description of the Prior Art

Curable silicone compositions are used to produce a variety of molded products by molding and curing at room temperature or under heating.

However, cured products of conventional curable silicone compositions have a large permanent compression set; hence it is difficult to use them as a material for producing molded products that are exposed to deformation under compressional stress for a long time, for example, roll members, connectors for automobiles, etc. Even if they can be used for such purposes, there is a problem that they need long-time postcuring at a high temperature so that the cured products might become stable, which results in a complicated molding process.

SUMMARY OF THE INVENTION

Accordingly, an object of the present invention is to provide a curable silicone composition that can produce a cured product having a small permanent compression set through a simple molding process.

The intensive research by the present inventors has led to a discovery that a curable silicone composition containing a vinyl group-containing organopolysiloxane, known as a retarder for curing by addition reaction of silicone rubbers, and a triazole compound, known as a retarder for curing by addition reaction of silicone rubbers and a flame-retardant for silicone rubbers can unexpectedly produce a cured product having a small permanent compression set and can be cured markedly rapidly and effectively.

Thus, according to the present invention, there is provided a curable silicone composition comprising:

(A) an organopolysiloxane containing at least two silicon-bonded unsaturated aliphatic hydrocarbon groups in the molecule and having a viscosity of from 100 to 200,000 cSt at 25° C., (B) a vinyl group-containing organocyclopolysiloxane having the general formula (I):

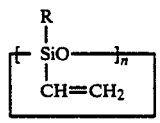
(I)

wherein R represents a substituted or unsubstituted monovalent hydrocarbon group having from 1 to 6 carbon atoms excluding unsaturated aliphatic hydrocarbon groups, and n represents an integer of from 3 to 8, (C) an organohydrogenpolysiloxane containing at least two silicon-bonded hydrogen atoms in the molecule, (D) a platinum family metal catalyst, and (E) a triazole compound.

The present invention also provides a cured product obtained by curing a silicone curable composition comprising said components (A), (B), (C), (D) and (E).

The present invention provides a method of lowering the permanent compression set of a cured product of a silicone rubber, comprising the step of curing a curable silicone composition comprising said components (A), (B), (C), (D) and (E).

The curable silicone composition of the present invention has improved curing properties and can produce cured products having a markedly small permanent compression set. Hence, this composition can be used suitably for producing cured products that may undergo deformation under compression stress for a long period, such as connectors for parts of automobiles, various rolls for copying machines, printing machines, etc., and various parts of household appliances.

DETAILED DESCRIPTION OF THE INVENTION

Component (A)

The organopolysiloxane of the component (A) is a main component of the present invention, and it has two or more silicon-bonded unsaturated aliphatic hydrocarbon groups in the molecule, which undergo addition reaction with Si—H bonds possessed by the organohydrogenpolysiloxane of the component (C) described later to thereby allow the composition to cure.

Preferably, the unsaturated aliphatic hydrocarbon groups account for not more than 20 mol %, more preferably from 0.2 to 5 mol %, of all the groups bonded to silicon atoms. Presence of the unsaturated aliphatic hydrocarbon groups in too large an amount may result in a cured product having poor heat resistance. The unsaturated aliphatic hydrocarbon group includes, for example, a vinyl group and an allyl group. Preferred is a vinyl group.

The group bonded to silicon atoms other than the unsaturated aliphatic hydrocarbon group includes, for example, aliphatic hydrocarbon groups such as methyl, ethyl, propyl, and octyl groups; aromatic hydrocarbon groups such as a phenyl group; substituted hydrocarbon groups in which the hydrogen atoms have been partly substituted by halogen atoms such as 3,3,3-trifluoropropyl group. Among these groups, the methyl group is normally a typical one. However, the phenyl group is preferred in that a composition having good heat resistance and a large refractive index can be prepared. The 3,3,3-trifluoropropyl group is preferred inasmuch as solvent resistance and oil resistance can be improved.

This organopolysiloxane is normally linear, but it may be slightly branched. The unsaturated aliphatic hydrocarbon group may be positioned either at a terminal of the molecule or on a side chain, or alternatively on both of these.

The organopolysiloxane of the component (A) has a viscosity of from 100 to 200,000 cSt at 25° C., and preferably has a viscosity of from 200 to 100,000 cSt with regard to workability of the composition obtained and properties of he cured products.

These organopolysiloxanes can be used singly or in combination of two or more.

Component (B)

The vinyl group-containing organocyclopolysiloxane of the component (B) is represented by the general formula (I):

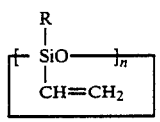

(I)

wherein R and n are as defined above.

This compound is known as a curing retarder, but, in the present invention, it serves to lower the permanent compression set of a cured product in cooperation with the triazole compound of the component (E) described later. The vinyl group-containing organocyclopolysiloxane also improves curing properties of the composition; specifically, it serves to promote cross-linking in the composition at the time of curing.

In the general formula (I), R represents a substituted or unsubstituted monovalent hydrocarbon group having from 1 to 6 carbon atoms excluding unsaturated aliphatic hydrocarbon groups, and includes, for example, alkyl groups such as a methyl group, an ethyl group, a propyl group, and a butyl group; substituted alkyl groups such as the 3,3,3-trifluoropropyl group; and aryl groups such as the phenyl group. Preferably, R represents a methyl group and an ethyl group. The symbol n represents an integer of from 3 to 8, preferably an integer of from 3 to 6. As the vinyl group-containing organopolysiloxane of the general formula (I), methylvinylcyclotetrasiloxane is preferred from industrial points of view.

The component (B) is normally contain in the composition of this invention in an amount of from 0.05 to 5 parts by weight, preferably from 0.1 to 3 parts by weight, per 100 parts by weight of the component (A). The component (B) in too small an amount cannot reduce the permanent compression set of the cured product of the composition; on the other hand, the component (B) in too large an amount may make the cured product hard and brittle.

The vinyl group-containing organopolysiloxane of the component (B) has a viscosity of not more than 100 cSt at 25° C., and is completely differentiated from the organopolysiloxane of the component (A) in this respect.

Component (C)

The organohydrogenpolysiloxane of the component (C) has 2 or more silicon-bonded hydrogen atoms in the molecule. This may have any structure of linear, branched and cyclic structures. This organohydrogenpolysiloxane acts as a crosslinking agent of the components (A) and (B).

The organohydrogenpolysiloxane includes, for example, the compounds shown below:

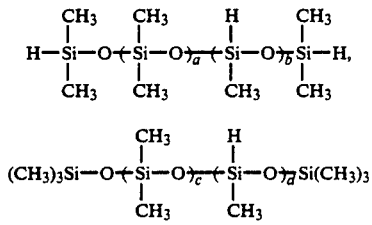

in the above two formulas, a, b, and c each represent an integer of 0 or more, and d represents an integer of 2 or more,

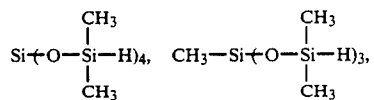

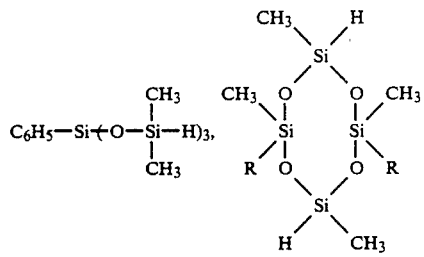

wherein R represents a hydrogen atom, a methyl group, a ethyl group, a propyl group, or a trimethylsiloxy group, and

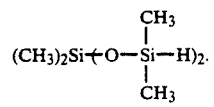

In the case where an organohydrogenpolysiloxane having two Si—H bonds is used as the component (C), it is preferable to add an organohydrogenpolysiloxane having 3 or more Si—H bonds thereto (Japanese Patent Publication (KOKOKU) No. 40447/1972), or alternatively to add an organopolysiloxane having 3 or more silicon-bonded unsaturated aliphatic hydrocarbon groups to the organopolysiloxane of the component (A).

Preferably, the amount of the component (C) is such that the number of the silicon-bonded hydrogen atoms contained therein is from 0.5 to 5 times, more preferably from 1 to 2 times, the total number of the silicon-bonded unsaturated aliphatic hydrocarbon groups contained in the component (A) and the vinyl groups contained in the component (B).

Component (D)

The platinum family metal catalyst of the component (D) catalyzes the addition reaction that occurs between unsaturated groups in said components (A) and (B) and Si—H bonds in the component (C).

The platinum family metal catalyst includes, for example, a platinum catalyst, a palladium catalyst, and rhodium catalyst, of which a platinum catalyst is preferred. The platinum catalyst includes, for example, platinum black, solid platinum supported on a carrier such as alumina or silica, chloroplatinic acid, alcohol-modified chloroplatinic acid, a complex of chloroplatinic acid with an olefin, and a complex of chloroplatinic acid with a vinylsiloxane. The palladium catalyst includes, for example, tetrakis(triphenylphosphine) palladium, and a mixture of palladium and triphenylphosphine.

In the case of a solid catalyst, in order to obtain good dispersibility, it is preferably used in the form of having a large specific surface area prepared by finely dividing or employing a carrier with a small particle size. The chloroplatinic acid or its complex with an olefin is preferably used as a solution in an alcohol, a ketone, an ether or a hydrocarbon solvent.

The catalyst is added in an amount such that a desired curing rate can be obtained, and in general it is added in an amount of from 0.5 to 1,000 ppm in terms of platinum family metal content based on the total of the component (A) and the component (B). Specifically, in the case of a catalyst compatible with siloxanes such as chloroplatinic acid, it is preferably used in an amount of from 1 to 100 ppm in terms of the platinum family metal content. In the case of a catalyst supported on a carrier such as platinum black, it is used in an amount of from 20 to 500 ppm in terms of the platinum family metal catalyst.

Component (E)

The triazole compound of the component (E) is known as a curing retarder or a flame-retardant, as stated above. However, this triazole compound serves to lower the permanent compression set of the cured product in combination with the vinyl group-containing organocyclopolysiloxane of the component (B) in the composition of the present invention.

The triazole compound includes, for example, 1,2,3-triazole, 1,2,4-triazole, benztriazole, and derivatives thereof. The derivatives of 1,2,3-triazole include, for example, 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole-4-aldehyde, and 4-cyano-1,2,3-triazole. The derivatives of 1,2,4-triazole include, for example, 1-methyl-1,2,4-triazole, 1,3-diphenyl-1,2,4-triazole, 5-amino-3-methyl-1,2,4-triazole, 3-mercapto-1,2,4-triazole, 1-phenyl-1,2,4-triazole-5-one, and 1-phenylurasole. The derivatives of benztriazole include, for example, 1-methylbenztriazole, 5,6-dimethylbenztriazole, 2-phenylbenztriazole, 1-hydroxybenztriazole, and methyl 1-benztriazolecarboxylate. Among these compounds, benztriazole, 1,2,3-triazole, and 1-methyl-1,2,3-triazole are the most preferred. These can be used singly or in combination of two or more.

The component (E) is used normally in an amount of from 0.005 to 1 part by weight, preferably 0.01 to 0.3 part by weight, per 100 parts by weight of the component (A). The component (E) in too small an amount leads to difficulty in lowering the permanent compression set of the cured product. The compound (E) in too large an amount may impair the curing properties of the composition.

The component (E) may be added to the composition as a solution in an organic solvent such as isopropanol, ethanol, benzene and toluene so that it may be dispersed uniformly in the composition.

Other Components

Preferably, the composition of the present invention contains a filler in addition to the components (A) to (E) for the purpose of improving the mechanical strength, etc. of the cured product obtained. As the filler, all sorts of fillers conventionally used for addition-type silicone rubber compositions can be used, including, for example, fumed silica, precipitated silica, hydrophobic silica, carbon black, titanium dioxide, ferric oxide, aluminum oxide, zinc oxide, powdery quartz, diatomaceous earth, calcium silicates, talc, bentonite, asbestos, glass fiber, and organic fibers. These can be added singly or in combination of two or more. The amount of the filler to be added is not limited as long as the objects of the present invention is not impaired. The filler is used in an amount of normally not more than 500 parts by weight, preferably from 3 to 500 parts by weight per 100 parts by weight of the component (A). Among the above fillers, for instance, fumed silica is preferably added in an amount of from 3 to 25 parts, and alumina, etc. are preferably added in an amount of from 300 to 500 parts by weight, per 100 parts by weight of the component (A). Therefore, the amount of a filler is desirably adjusted according to its oil absorption, surface area, specific gravity, etc.

The composition of the present invention may optionally contain a colorant, heat resistance improver (e.g., red iron oxide, black iron oxide and cerium oxide), retarder for addition reaction (e.g., acetylene compounds such as ethynylcyclohexanol, and triallyl isocyanurate). Moreover, a reinforcing agent such as resinous siloxanes composed of $SiO_2$ units and $R_3SiO_{0.5}$ units where R represents an organic group, or a release agent such as functional group-free silicone oils may be added.

Preparation and Curing of the Curable Silicone Composition

The curable silicone composition of the present invention can be prepared by mixing the respective components described above uniformly. Normally, it is often prepared as a two-pack type one consisting of a mixture of the components (A), (B) and (D) and another mixture of the components (A), (C) and (E), which are to be mixed just before being used. In that case, a filler, which is an optional component, is preferably added to both of the mixtures. In the case where the composition of the present invention is prepared as one-pack type one, a retarder for addition reaction is preferably added to the composition so that curing may be controlled during storage.

The composition of the present invention can be cured at room temperature or under heating to produce an elastic product. The curing can be conducted in a temperature controlled chamber, for instance, or in an injection mold when the composition is injection molded.

EXAMPLES

This invention will be described by way of Examples, but this invention is not limited to these Examples. In the description below, "part(s)" means "part(s) by weight", and viscosity is all expressed as a value at 25° C.

EXAMPLE 1

An addition type silicone rubber composition (a) was prepared by mixing:

100 parts of methylvinylsilicone oil which was terminated with dimethylvinylsiloxy groups at its both ends and the backbone chain of which was composed of dimethylsiloxane units (viscosity: 5,000 cSt), 1.0 part of 1,3,5,7-tetramethyl-1,3,5,7-tetravinylcyclotetrasiloxane, 5.0 parts of methylhydrogenpolysiloxane represented by the average formula:

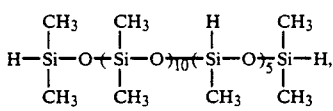

10 parts of fumed silica (specific surface area: m²/g) of which surfaces had been made hydrophobic by treatment, a 1 % chloroplatinate solution in isopropyl alcohol in amount of 30 ppm in terms of platinum content based or the methylvinylsilicone oil, 0.03 part of a 50% benztriazole solution in ethanol, and 0.05 part of ethynylcycolhexanol as a retarder.

The composition (a) was pressed at 170° C. for 10 minutes to form a sheet having a thickness of 2 mm, and test specimens for measuring permanent compression set were produced from the sheet in accordance with JIS K 6301.

These test specimens were divided into two groups. The test specimens of one groups were postcured at 200° C. for 2 hours; howevere the test specimens of the other group were not postcured.

Each of the two kinds of test specimens thus obtained was tested for permanent compression set at 180° C. for 22 hours in accordance with JIS K 6301.

In the same manner as described above the composition (a) was pressed at 170° C. for 10 minutes to form a sheet having a thickness of 2 mm, and the sheet obtained was then postcured at 200° C. for 2 hours. The hardness (JIS A), elongation and tensile strength of the sheet thus postcured were measured according to JIS K 6301. Results obtained are shown in Table 1.

COMPARATIVE EXAMPLE 1

A composition (b) was prepared in the same manner as in Example 1, except that 1,3,5,7-tetramethyl-1,3,5,7-tetravinylcyclotetrasiloxane and the 50% benztriazole solution in ethanol were not used, and that the amount of the methylhydrogenpolysiloxane was changed to 1.7 parts.

In the same manner as in Example 1, test specimens were produced from the composition (b), and the permanent compression set, the hardness, the elongation and the tensile strength were measured. Results obtained are shown in Table 1.

COMPARATIVE EXAMPLE 2

A composition (c) was prepared in the same manner as in Example 1, except that the 50% benztriazole solution in ethanol was not used.

In the same manner as in Example 1, test specimens were produced from the composition (c), and the permanent compression set, the hardness, the elongation and the tensile strength were measured. Results obtained are shown in Table 1.

COMPARATIVE EXAMPLE 3

A composition (d) was prepared in the same manner as in Example 1, except that the 1,3,5,7-tetramethyl-1,3,5,7-tetravinylcyclotetrasiloxane was not used and that the amount of the methylhydrogenpolysiloxane was changed to 1.7 parts.

In the same manner as in Example 1, test specimens were produced form the composition (d), and the properties as a rubber and the permanent compression set were measured. Results obtained are shown in Table 1.

TABLE 1

| | Example 1 | | Comparative Example 1 | | Comparative Example 2 | | Comparative Example 3 | |
|---|---|---|---|---|---|---|---|---|
| Postcure | not conducted | conducted | not conducted | conducted | not conducted | conducted | not conducted | conducted |
| Hardness [JIS A] | 34 | 35 | 30 | 35 | 32 | 36 | 27 | 32 |
| Elongation (%) | 400 | 380 | 420 | 360 | 410 | 380 | 420 | 400 |
| Tensile Strength (kgf/cm²) | 20 | 23 | 17 | 20 | 20 | 24 | 18 | 21 |
| Permanent compression Set (%) (at 180° C., tor 22 hrs) | 18 | 5 | 35 | 13 | 33 | 11 | 25 | 10 |

EXAMPLE 2

An addition type silicone rubber composition (e) was prepared by mixing:

50 parts of methylvinylsilicone oil which was terminated with dimethylvinylsiloxy groups at its both ends and the backbone chain of which was composed of dimethylsiloxane units (viscosity: 5,000 cSt), 50 parts of methylvinylsilicone oil having a viscosity of 100,000 cSt, 0.3 part of 1,3,5,7-tetramethyl-1,3,5,7-tetravinylcyclotetrasiloxane, 2.3 parts of methylhydrogenpolysiloxane represented by the average composition formula:

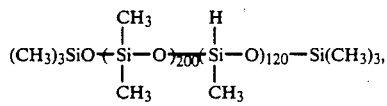

10 parts of fumed silica (specific surface area: 200 m²/g) of which surfaces had been made hydrophobic by treatment, 150 parts of wet silica having a specific surface area of 1 m²/g, a 1% chloroplatinate solution in isopropyl alcohol in amount of 50 ppm in terms of platinum content based on the total amount of said two kinds of methylvinylsilicone oil, 0.03 part of a 50% benztriazole solution in ethanol, and 0.05 part of ethynylcyclohexanol as a retarder.

In the same manner as in Example 1, a cured product was obtained from the composition (f), and the permanent compression set, hardness, elongation and tensile strength of the cured product were measured. Results obtained are shown in Table 2.

COMPARATIVE EXAMPLE 4

A composition (f) was prepared in the same manner as in Example 2, except that the 1,3,5,7-tetramethyl-1,3,5,7-tetravinylcyclotetrasiloxane and the 50% benztriazole in ethanol were not used, and that the amount of the methylhydrogenpolysiloxane was changed to 1.3 parts.

In the same manner as in Example 1, a cured product was produced from the composition (f), and properties as a rubber and the permanent compression set were measured. Results obtained are shown in Table 2.

COMPARATIVE EXAMPLE 5

A composition (g) was prepared in the same manner as in Example 2, except that the 50% benztriazole solution in ethanol was not used.

In the same manner as in Example 1, test specimens were produced from the composition (g) and properties as a rubber and the permanent compression set were measured. Results obtained are shown in Table 2.

COMPARATIVE EXAMPLE 6

A composition (h) was prepared in the same manner as in Example 2, except that the 1,3,5,7-tetramethyl-1,3,5,7-tetravinylcyclotetrasiloxane was not used and that the amount of the methylhydrogenpolysiloxane was changed to 1.3 parts.

In the same manner as in Example 1, test specimens were produced from the composition (g) and properties as a rubber and the permanent compression set were measured. Results obtained are shown in Table 2.

TABLE 2

| | Example 2 | | Comparative Example 4 | | Comparative Example 5 | | Comparative Example 6 | |
|---|---|---|---|---|---|---|---|---|
| Postcure | not conducted | conducted | not conducted | conducted | not conducted | conducted | not conducted | conducted |
| Hardness [JIS A] | 44 | 45 | 40 | 45 | 41 | 46 | 38 | 42 |
| Elongation (%) | 380 | 310 | 350 | 290 | 360 | 310 | 400 | 370 |
| Tensile Strength (kgf/cm$^2$) | 38 | 42 | 36 | 40 | 38 | 44 | 36 | 40 |
| Permanent compression Set (%) (at 180° C., tor 22 hrs) | 10 | 4 | 24 | 11 | 20 | 9 | 18 | 7 |

We claim:

1. A curable silicone composition comprising:
   (A) an organopolysiloxane containing at least two silicon-bonded unsaturated aliphatic hydrocarbon groups in the molecule and having a viscosity of from 100 to 200,000 cSt at 25° C.,
   (B) a vinyl group-containing organocyclopolysiloxane having the general formula (I):

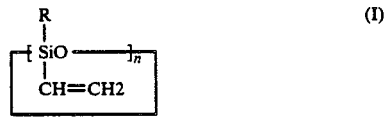

wherein R represents a substituted or unsubstituted monovalent hydrocarbon group having from 1 to 6 carbon atoms excluding unsaturated aliphatic hydrocarbon groups, and n represents an integer of from 3 to 8,
   (C) an organohydrogenpolysiloxane containing at least two silicon-bonded hydrogen atoms in the molecule,
   (D) a platinum family metal catalyst, and
   (E) a curing retardant or flame retardant triazole compound.

2. The composition according to claim 1, wherein said component (B) is contained in an amount of from 0.05 to 5 parts by weight, and said component (E) is contained in an amount of from 0.005 to 1 part by weight, per 100 parts by weight of said component (A).

3. The composition according to claim 1, wherein said component (B) is contained in an amount of from 0.1 to 3 parts by weight, and said component (E) is contained in an amount of from 0.001 to 0.3 part by weight, per 100 parts by weight of said component (A).

4. The composition according to claim 1, wherein said component (C) is contained in an amount such that the number of the silicon-bonded hydrogen atoms therein is from 0.5 to 5 times the total number of the silicon-bonded unsaturated aliphatic hydrocarbon groups contained in said component (A) and the vinyl groups contained in said component (B).

5. The composition according to claim 1, which further comprises a filler.

6. The composition according to claim 1, wherein said filler is contained in an amount of from 3 to 500 parts by weight per 100 parts by weight of said component (A).

7. A cured product obtained by curing a silicone curable composition comprising said components (A), (B), (C), (D) and (E) recited in claim 1.

8. A method of lowering the permanent compression set of a cured product of a silicone rubber, comprising the step of curing a curable silicone composition comprising said components (A), (B), (C), (D) and (E) recited in claim 1.

9. A curable silicon composition as recited in claim 1 wherein said curing retardant or flame retardant triazole compound is a compound selected from the group consisting of 1,2,3-triazole, 1,2,4,-triazole, benztriazole, 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3,-triazole, 1,2,3-triazole-4-aldehyde, 4-cyano-1,2,3-triazole, 1-methyl-1,2,4-triazole, 1,3-diphenyl-1,2,4-triazole, 5-amino-3-methyl-1,2,4-triazole, 3-mercapto-1,2,4-triazole, 1-phenyl-1,2,4-triazole-5-one, 1-phenylurasole, 1-methylbenztriazole, 5,6-dimethylbenztriazole, 2-phenylbenztriazole, 1-hydroxybenztriazole and methyl 1-benztriazolecarboxylate.

* * * * *